(12) United States Patent
Hull et al.

(10) Patent No.: US 8,296,913 B2
(45) Date of Patent: Oct. 30, 2012

(54) THERMALLY SWITCHED FERROMAGNETIC LATCHING SUPPORT SYSTEM

(75) Inventors: John R. Hull, Sammamish, WA (US); Michael Strasik, Sammamish, WA (US)

(73) Assignee: The Boeing Company, Chicago, IL (US)

( * ) Notice: Subject to any disclaimer, the term of this patent is extended or adjusted under 35 U.S.C. 154(b) by 626 days.

(21) Appl. No.: 12/414,204

(22) Filed: Mar. 30, 2009

(65) Prior Publication Data

US 2010/0244343 A1 Sep. 30, 2010

(51) Int. Cl.
*B21D 53/46* (2006.01)
*B23P 13/00* (2006.01)
*B23P 19/04* (2006.01)
*H02K 41/02* (2006.01)
*H02K 7/09* (2006.01)
*B25B 11/00* (2006.01)

(52) U.S. Cl. .............. 29/227; 29/3; 29/8; 310/12.31; 310/90.5

(58) Field of Classification Search ............ 29/227, 29/8, 3, 6, 7, 95, 329; 310/12.31, 90.5
See application file for complete search history.

(56) References Cited

U.S. PATENT DOCUMENTS

| | | | | |
|---|---|---|---|---|
| 3,376,615 A * | 4/1968 | Heckman | ............... | 24/303 |
| 3,710,605 A * | 1/1973 | Trikilis | ............... | 70/57.1 |
| 3,976,339 A * | 8/1976 | Sabnis | ............... | 310/90.5 |
| 4,585,282 A * | 4/1986 | Bosley | ............... | 310/90.5 |
| 4,703,617 A * | 11/1987 | Engeli et al. | ............... | 57/263 |
| 5,368,132 A * | 11/1994 | Hollowell et al. | ............... | 187/393 |
| 5,520,059 A * | 5/1996 | Garshelis | ............... | 73/862.335 |
| 5,625,240 A * | 4/1997 | Bernus | ............... | 310/90.5 |
| 5,644,919 A | 7/1997 | Baker et al. | | |
| 5,825,105 A * | 10/1998 | Barber et al. | ............... | 310/12.31 |
| 5,831,362 A * | 11/1998 | Chu et al. | ............... | 310/90.5 |
| 6,008,638 A * | 12/1999 | Bleckmann et al. | ............... | 324/166 |
| 6,046,139 A | 4/2000 | Blohowiak et al. | | |
| 6,071,093 A * | 6/2000 | Hart | ............... | 417/424.2 |
| 6,079,267 A * | 6/2000 | Hull | ............... | 73/382 R |
| 6,175,175 B1 * | 1/2001 | Hull | ............... | 310/90.5 |
| 6,180,928 B1 | 1/2001 | Garrigus | | |
| 6,211,589 B1 | 4/2001 | Ahlstrom et al. | | |
| 6,916,045 B2 * | 7/2005 | Clancy et al. | ............... | 280/805 |
| 7,070,398 B2 * | 7/2006 | Olsen et al. | ............... | 417/353 |
| 7,090,013 B2 * | 8/2006 | Wellington | ............... | 166/267 |
| 7,097,140 B2 * | 8/2006 | Staley et al. | ............... | 244/165 |
| 7,172,223 B2 | 2/2007 | Storvick et al. | | |
| 7,185,541 B1 * | 3/2007 | Edelstein | ............... | 73/514.16 |
| 7,318,517 B2 * | 1/2008 | Roder et al. | ............... | 198/619 |
| 7,501,595 B2 * | 3/2009 | Dimig et al. | ............... | 200/61.62 |
| 7,565,084 B1 * | 7/2009 | Wach | ............... | 398/201 |
| 7,976,271 B2 * | 7/2011 | LaRose et al. | ............... | 415/104 |
| 8,053,726 B2 * | 11/2011 | Nakasuji et al. | ............... | 250/310 |
| 2003/0108664 A1 * | 6/2003 | Kodas et al. | ............... | 427/125 |
| 2004/0077105 A1 * | 4/2004 | Wu et al. | ............... | 436/524 |
| 2004/0210289 A1 * | 10/2004 | Wang et al. | ............... | 607/116 |
| 2006/0171091 A1 * | 8/2006 | Seale et al. | ............... | 361/160 |
| 2007/0138719 A1 * | 6/2007 | Ichikawa et al. | ............... | 267/140.14 |
| 2009/0139724 A1 * | 6/2009 | Gray et al. | ............... | 166/345 |

* cited by examiner

*Primary Examiner* — Lee D Wilson
*Assistant Examiner* — Alvin Grant
(74) *Attorney, Agent, or Firm* — McNees Wallace & Nurick LLC (57) ABSTRACT

A ferromagnetic latching support system for positioning a surface is disclosed. The latching support system includes a mechanical support and a ferromagnetic device.

12 Claims, 10 Drawing Sheets

THERMALLY SWITCHED FERROMAGNETIC LATCHING SUPPORT SYSTEM

FIELD

This disclosure relates generally to a latching system, and more particularly to a passive, contactless support system including a ferromagnetic latch and a high-temperature superconductor levitation device.

BACKGROUND

Conventionally, objects have been mechanically supported by a mechanical system. The mechanical support system includes mechanical supports that may decrease the efficiency of thermally insulated objects, such as cryogenic tanks. For example, conventional liquid hydrogen (LH2) storage tanks may include a inner tank connected to the outer tank by fixed supports. The inner tank is insulated from the outer tank by a vacuum and radiation shields. The supporting structures may increase heat input from the outer tank to the inner tank, which results in evaporation loss of LH2.

In another application, flywheels may be supported by a high-temperature superconducting (HTS) levitation system that includes active mechanical supports. When the HTS levitation system is activated, the mechanical supports are withdrawn by operation of an electric motor or other means. The mechanical support mechanism requires control electronics and wires entering the vacuum chamber where the flywheel is located, thus complicating the structure of the vacuum chamber.

There is a need for a passive, contactless system to support objects that improves the thermal insulation of the object and simplifies the construction of the support.

SUMMARY

The following embodiments and aspects thereof are described and illustrated in conjunction with systems and methods that are meant to be exemplary and illustrative, not limiting in scope. In various embodiments, one or more of the problems described above in the Background have been reduced or eliminated, while other embodiments are directed to other improvements.

A first embodiment of the disclosure includes a ferromagnetic latching support system for positioning a surface including a mechanical support and a ferromagnetic device.

A second embodiment of the disclosure includes a method of a levitation system for positioning a surface including a ferromagnetic latching support system and a high-temperature superconductor levitation system.

A third embodiment of the disclosure includes a method of supporting an object including mechanically supporting the object in a mechanical support position by a mechanical support, retracting the mechanical support from the object, and latching the mechanical support into a latched position by a magnetic flux generated by a ferromagnetic latching support system.

One advantage of the present disclosure is to provide a passive, thermally switched ferromagnetic latching support system.

Another advantage of the present disclosure is to provide a passive, magnetically levitated support system.

Another advantage of the present disclosure is to provide a passive, magnetically levitated support system that includes a thermally switched ferromagnetic latching support system and an HTS levitation system.

Another advantage of the present disclosure is to provide a levitation method without any mechanical support that minimizes the conductive heat transfer to the levitated object, thus providing improved thermal insulation to the levitated object.

Another advantage of the present disclosure is to provide a passive, magnetically levitated support system that levitates an object in such a manner that the object experiences extremely low friction in one or more degrees of freedom.

Another advantage of the present disclosure is to provide a passive levitation system that does not need active electronic stabilization.

Another advantage of the present disclosure is to provide a passive levitation system including a superconducting suspension component.

Another advantage of the present disclosure is to provide a contactless system for supporting an object.

Yet another advantage of the present disclosure is to provide a totally passive, support of an object.

Yet another advantage of the present disclosure is to provide a totally passive, magnetically levitated support for a cryogenic storage tank.

Yet another advantage of the present disclosure is to provide a totally passive, magnetically levitated support of a flywheel.

Further aspects of the method and apparatus are disclosed herein. Other features and advantages of the present disclosure will be apparent from the following more detailed description of the preferred embodiment, taken in conjunction with the accompanying drawings that illustrate, by way of example, the principles of the disclosure.

DETAILED DESCRIPTION

The present disclosure now will be described more fully hereinafter with reference to the accompanying drawing, in which a preferred embodiment of the disclosure is shown. This disclosure may, however, be embodied in many different forms and should not be construed as limited to the embodiments set forth herein; rather, these embodiments are provided so that this disclosure will be thorough and complete and will fully convey the scope of the disclosure to those skilled in the art. All composition percents are weight percent, unless otherwise specified.

According to the present disclosure, a thermally switched ferromagnetic latch system (latch system) is disclosed that includes a magnetic circuit including a thermally switchable ferromagnetic element, a non-switchable ferromagnetic element and a support component. The switchable ferromagnetic material is thermally connected to a thermal control surface The thermal control surface is cooled by a cooling source. The cooling source may be for example, but not limited to, a cooling fluid or cooling system. In one embodiment, the cooling fluid may be a cryogenic fluid. In another embodiment, the cooling system may be a solid state cooling system. For example, the cooling source may be a thermoelectric cooler. The position where the latch system is engaged depends on a predetermined reference point temperature, which is dependent upon a temperature of the thermal control surface, the material composition of the switchable ferromagnetic component, and the thermal path between the thermal control surface and the switchable ferromagnetic component.

In one embodiment, a latch system is disclosed that includes a magnetic circuit formed of permanent magnets and ferromagnetic material. In this embodiment, the latch system is passively activated to withdraw a mechanical support from contact with a surface being supported, and the mechanical support is latched in a withdrawn position. In another embodiment, the mechanical support is withdrawn and latched, and additionally, the latch system provides a levitational force.

Levitation provided by the latch system may be inherently passively unstable. The latch system may be passively stable in as many as two orthogonal geometric directions, but may be passively unstable in at least one orthogonal direction. Thus, the latch system requires either a mechanical or other magnetic system to form a stable levitation system. A magnetic system capable of providing stable support is a high-temperature superconductor (HTS) system. An HTS levitation system, because of the use of the superconducting material, can be passively stable in all three orthogonal directions and be combined with the latch system to provide a stable levitation system. The latch system may thus provide levitational support in some embodiments, but will be combined with an HTS levitational system to form a passive stable levitation system, which is passively stable in all directions.

In another embodiment, an auxiliary mechanical system such as a mechanical constraint may be used to stabilize an object levitated by the latch system. Such a mechanical constraint can be small and not conduct much thermal energy. Thus, the latch system can either be used with a HTS levitation system to provide an object that is completely levitated or the latch system can be used with an auxiliary mechanical system such that the latch system provides all of the levitational force and the auxiliary mechanical system provides stability to the levitated object.

In an exemplary method of operation of the latch system, the thermal surface is brought into contact with a cooling fluid, for example liquid hydrogen (LH2), and the temperature of the thermal surface begins to decrease. When the temperature of the thermal surface reaches a predetermined reference temperature, the ferromagnetic material in contact with the thermal surface reaches the Curie temperature of the switchable ferromagnetic material, and the switchable ferromagnetic material becomes ferromagnetic. The magnetic circuit exerts a force on the support component, which moves the support component and latches the support component into a latched position. The latch system latches the support component into the latched position for as long as the temperature of the ferromagnetic material is at or below the Curie temperature, or in other words, for as long as the switchable ferromagnetic material remains magnetic. A more detailed discussion of ferromagnetic materials is provided in U.S. Pat. No. 6,180,928, which is incorporated herein by reference in its entirety.

In some embodiments, the latch system is combined with a high-temperature superconductor (HTS) levitation device to form a levitation device that provides a totally passive, magnetically levitated support of an object. The HTS levitation device includes an HTS component and a permanent magnetic (PM) component. The magnetic flux of the PM component becomes trapped in the HTS component when the temperature of the HTS component falls below a critical temperature (Tc).

In an exemplary method of operation of the HTS levitation device, an object is mechanically supported at a first temperature within a system by a mechanical support element. The first temperature is above the Tc of the HTS component. When the temperature of the HTS component decreases to a second temperature below the Tc of the HTS component, the HTS levitation device activates and the mechanical support element may then be removed. As the object moves a small distance to an equilibrium position, the magnetic flux in the HTS levitation device passively adjusts to provide a levitational force to prevent any further motion from the object's levitated equilibrium position. A discussion of high-temperature superconductors is provided in U.S. Pat. No. 6,046,139, which is incorporated herein by reference in its entirety.

When used with the latch system, the HTS levitation device activates before the latch system activates, or in other words, while the Tc is higher than the Curie temperature of the ferromagnetic material of the latch system. As the temperature continues to decrease and reach the Curie temperature of the ferromagnetic material of the latch system, the latch system activates and the mechanical support is automatically removed from the levitated object. When the temperature of the latch system is increased, and the temperature of the switchable ferromagnetic material rises above the Curie temperature of the switchable ferromagnetic material, the latch system deactivates, and the mechanical support moves back into position to mechanically support the object. As the temperature continues to increase to the Tc of the HTS component, the HTS device deactivates and the object no longer experiences levitational support and is entirely supported by the mechanical support. In some embodiments, the latch system may provide part of the levitational force. If the latch system provides additional levitational support, the levitated object may move slightly to a new equilibrium position with the HTS levitational system providing part of the levitational support and stability against movement away from the equilibrium position. In other embodiments, the latch system does not provide levitational support.

Figure 1:
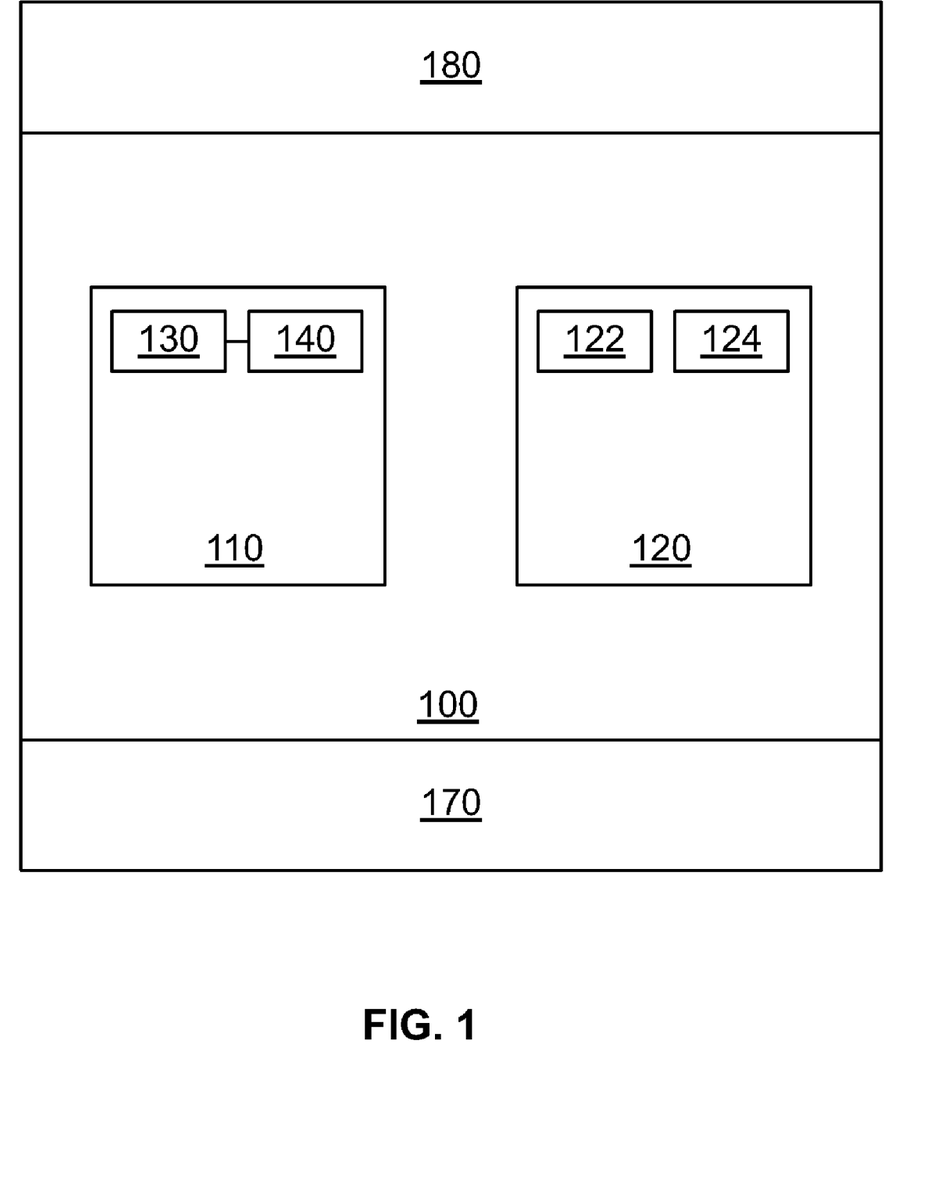
FIG. 1 is a block diagram of an exemplary embodiment of a thermally switched ferromagnetic latching support system according to the disclosure.

FIG. 1 is a block diagram showing a thermally switched ferromagnetic latch system (latch system) 100 disposed between a mechanical ambient support 170 and a surface 180. The latch system 100 includes a mechanical support 110 and a ferromagnetic device 120. The mechanical support 110 includes a latch element 130 attached to a support post 140. The ferromagnetic device 120 includes a thermally switchable ferromagnetic element 122 and a permanent magnet 124.

Figure 2:
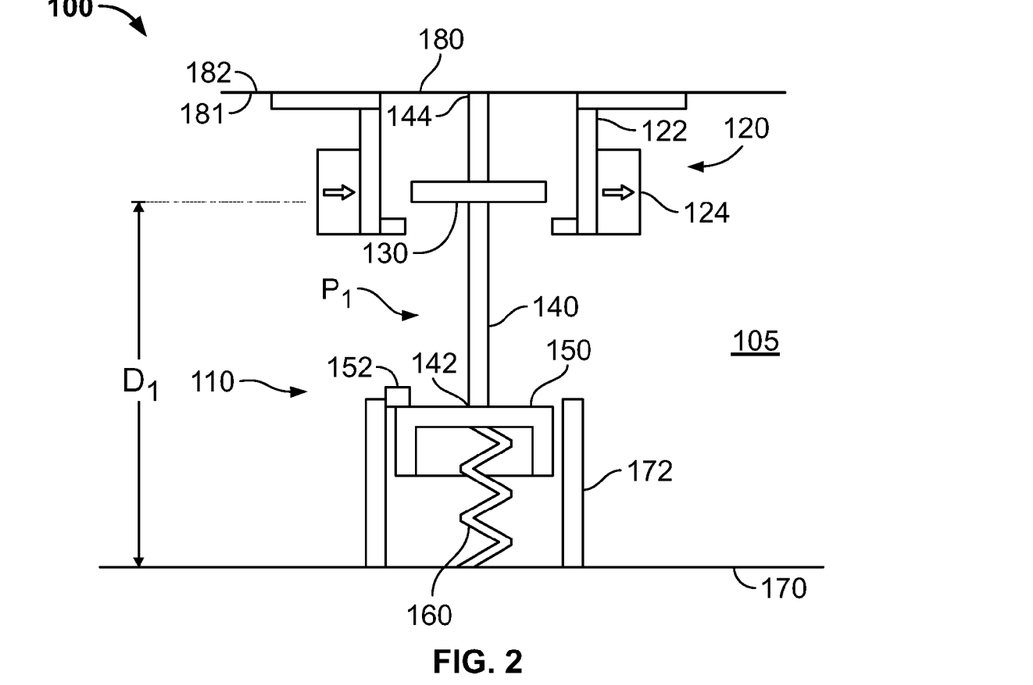
FIG. 2 is an exemplary embodiment of a thermally switched ferromagnetic latching support system in a mechanical support position according to the disclosure.

FIG. 2 illustrates an exemplary embodiment of a latch system 100 in a mechanical support position according to the disclosure. The latch system 100 is disposed in a space 105 between an ambient mechanical support 170 and a surface 180. The latch system 100 includes a mechanical support 110 and a ferromagnetic device 120. The mechanical support 110 includes a latch element 130 attached to a support post 140. In this exemplary embodiment, the latch element 130 is a ferromagnetic element. The latch element 130 is non-switchable. The latch element 130 is in a first position $P_1$ at a first distance $D_1$ from an ambient mechanical support 170. In one embodiment, the latch element 130 is formed of a material that is ferromagnetic at ambient temperatures and below. For example, the latch element 130 may be formed, without limitation, of a metal, an alloy or a composite. In one embodiment, the latch element 130 is formed of a low-carbon steel.

Figure 18:
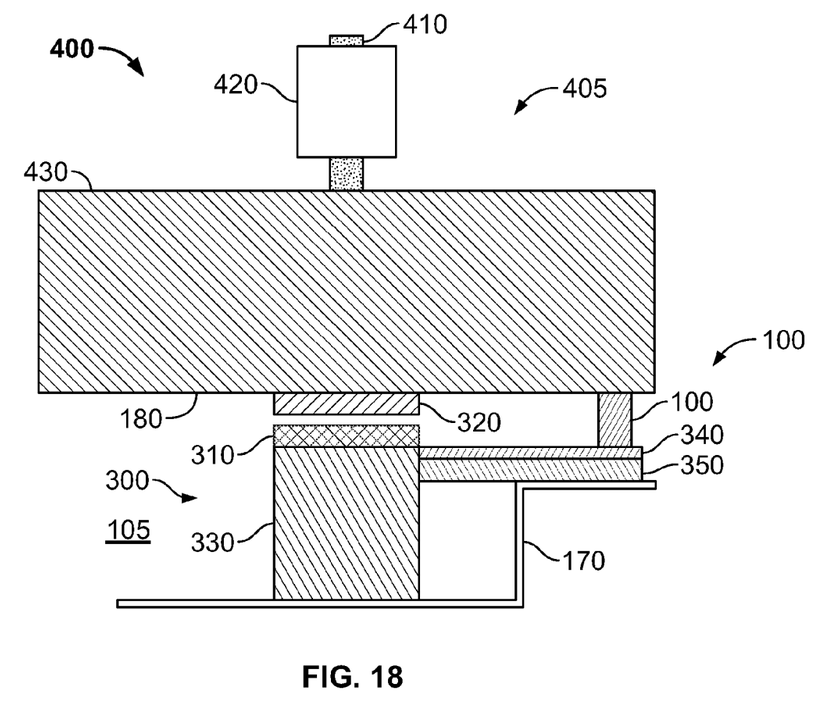
FIG. 18 illustrates an exemplary embodiment of an object support system according to the disclosure.

The space 105 may be a vacuum and/or there may be insulation 540 as shown in FIG. 18 to further insulate the surface 180 and/or any supported object (not shown). In one embodiment, the insulation 540 may be a multi-layer insulation, for example, and without limitation, multiple layers of an aluminized polymer film. In one embodiment, the aluminized polymer film may be MYLAR®, produced by E.I. du Pont de Nemours and Company.

The mechanical support 110 further includes an elastic support element 150 contacting a fixed end or first end 142 of the support post 140, and an elastic element 160 disposed between the elastic support element 150 and the ambient mechanical support 170. In this embodiment, the elastic support element 150 is a spring support cup and the elastic element 160 is a mechanical spring. In another embodiment, the elastic support element 150 may be another support structure that secures and supports the elastic element 160. In yet another embodiment, the elastic support element 150 may be a recess (not shown) in the support post 140, or another support structure. A free end or second end 144 of the support post 140, opposite the first end 142, contacts a surface 180 to be supported by the system 100. The surface 180 may be a thermal control surface. The surface 180 includes a first side 181 and a second side 182. The elastic element 160 urges against the ambient mechanical support 170 and the elastic support element 150, acting to urge the elastic support element 150 and support post 140 vertically upward and against the surface 180.

A guide support 172 contacts the ambient mechanical support 170. The guide support 172 provides horizontal support to the elastic support element 150 to maintain the position of the elastic support element 150 in a substantially fixed horizontal position, while allowing the elastic support element 150 to move vertically. The latch system 100 may include an optional mechanical stop 152 that limits the distance $D_1$.

The ferromagnetic device 120 includes a thermally switchable ferromagnetic element 122 in thermal contact with the surface 180. The surface 180 is a thermal control surface, which is brought into contact with a cooled fluid (not shown). The cooled fluid may be liquid hydrogen (LH2). The surface 180 is in thermal contact with the ferromagnetic device 120. The switchable ferromagnetic element 122 is in horizontal proximity with the latch element 130 and is configured to apply a force to locate the latch element 130 at a predetermined position when the switchable ferromagnetic element 122 is activated.

The ferromagnetic device 120 further includes a permanent magnet 124 disposed adjacent the switchable ferromagnetic element 122. In another embodiment, the permanent magnet 124 is disposed proximate the switchable ferromagnetic element 122. In this exemplary embodiment, the ferromagnetic device 120 includes two permanent magnets 124. In another embodiment, the ferromagnetic device includes at least one permanent magnet 124. The permanent magnet 124 provides the magnetomotive force for a magnetic flux circuit 126 (FIG. 3) that is present when the latch system 100 is activated, which results in the magnetic force.

Figure 3:
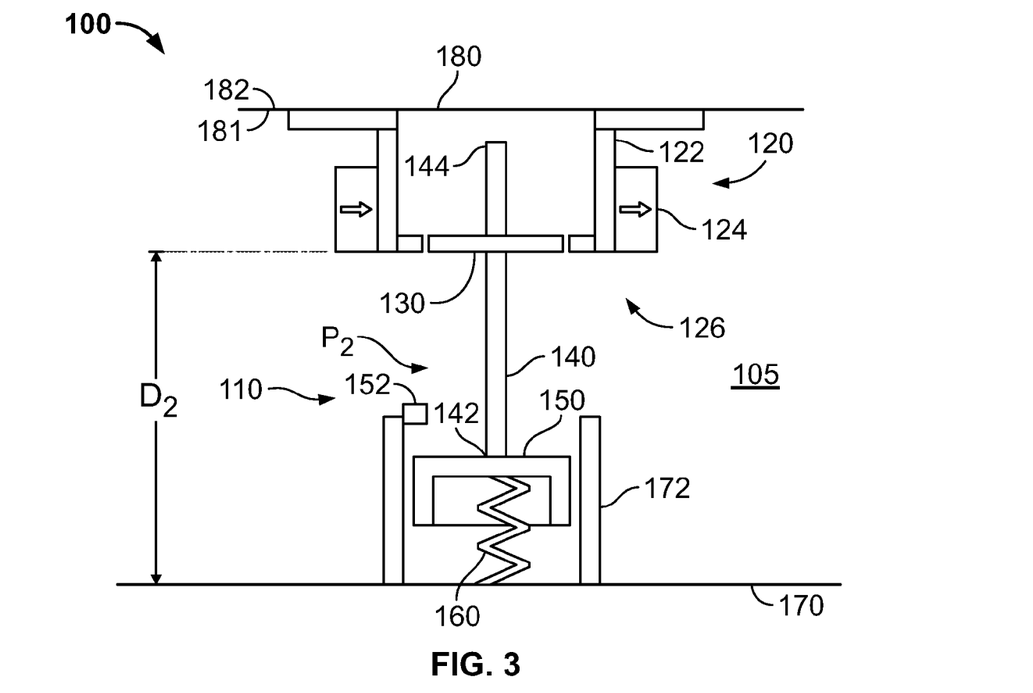
FIG. 3 is an exemplary embodiment of a thermally switched ferromagnetic latching support system in a levitating support position according to the disclosure.

FIG. 3 shows the latch system 100 activated and the surface 180 in a levitational support position. As shown in FIG. 3, the switchable ferromagnetic element 122 has been activated by lowering the temperature of the surface 180, and a magnetic flux circuit 126 has been formed by the permanent magnet 124, the activated switchable ferromagnetic element 122, and the latch element 130. The magnetic flux circuit 126 has formed a magnetic force strong enough to overcome the force of the spring 160 and has moved or retracted the latch element 130 to a second position $P_2$ at a second distance $D_2$ from the ambient mechanical support 170. The second distance $D_2$ is less than the first distance $D_1$, or in other words, the latch element 130 is brought closer to the ambient mechanical support 170 and the support post 140 has been moved away from contact with the surface 180. In the second position $P_2$ as shown in FIG. 3, an equilibrium has been obtained between the force to compress the spring 160 and the downward force on latch element 130 provided by the interaction between the latch element 130 and both the thermally switchable ferromagnetic element 122 and the permanent magnet 124. In this exemplary embodiment to retraction of the support post 140 and the compression of the spring 160 has also moved the spring support cup 160 towards the ambient mechanical support 170. In another embodiment, the retraction of the support post 140 and the compression of the spring 160 may move the support cup towards and into contact with the mechanical support 170. In the activated position shown in FIG. 3, the latch system 100 provides a levitational force to the surface 180.

Figure 4:
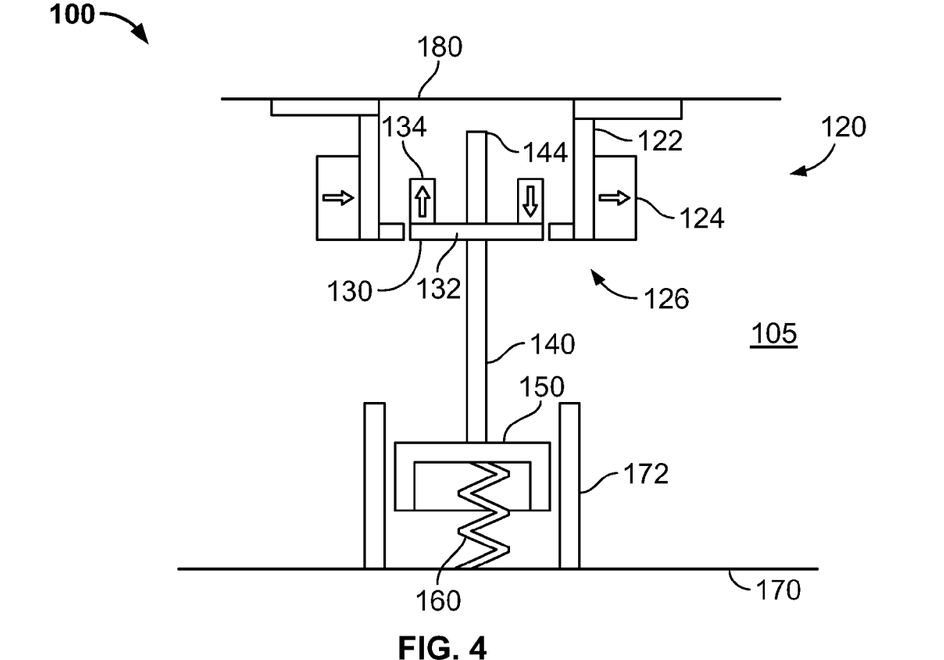
FIG. 4 illustrates another exemplary embodiment of a passive, thermally switched ferromagnetic latching support in a levitating support position according to the disclosure.

FIG. 4 illustrates another exemplary embodiment of the latch system 100 activated and the surface 180 in a levitational support position. In this embodiment, the latch element 130 includes a support element 132 and a permanent magnet 134. The support element 132 may be, without limitation, a metal, alloy or composite member. In one embodiment, the support element 132 may be a non-ferromagnetic element. In another embodiment, the support element 132 may be a ferromagnetic element. In this exemplary embodiment, the latch element 130 includes two permanent magnets 134. In another embodiment, the latch element 130 may include one or more permanent magnets 134.

As shown in FIGS. 3 and 4, the support post 140 is latched in the vertical direction by the interaction between the ferromagnetic device 120 and the latch element 130. However, the latch system 100 is unstable in the horizontal direction, and would be used with an additional support system (not shown in FIGS. 3 and 4) to provide stability. The additional support system may be an HTS levitation system 300 (FIG. 14) of a levitation system 200, which is further discussed below. While the latch system 100 may provide some vertical support, the primary purpose of the latch system 100 is to latch the support post 140 into a position where it no longer provides mechanical support to the surface 180. In the activated position shown in FIGS. 3 and 4, the latch system 100 may provide a levitational force to the surface 180.

Figure 5:
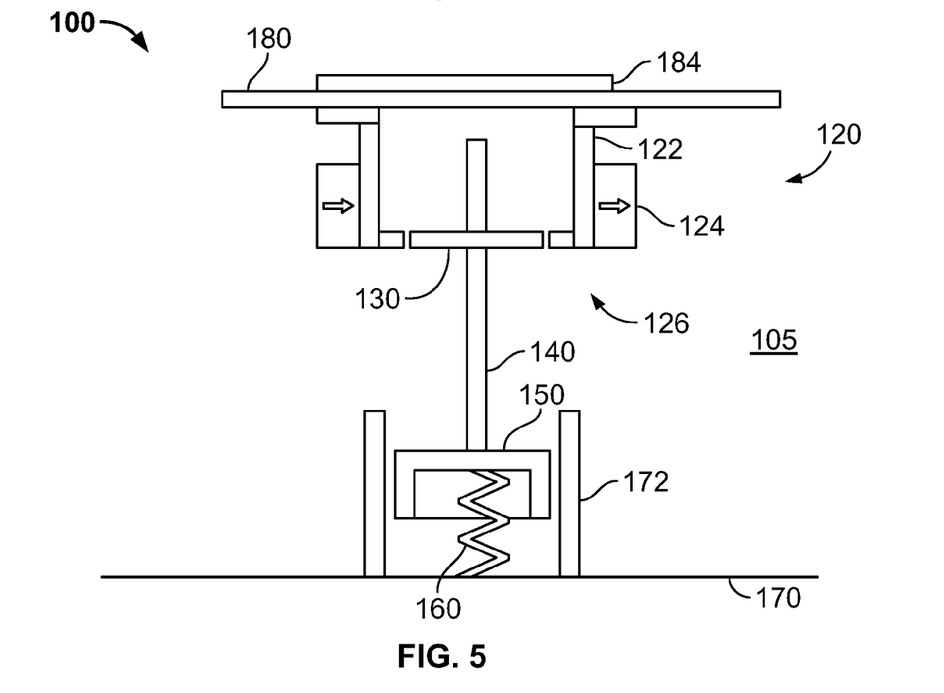
FIG. 5 illustrates another exemplary embodiment of a passive, thermally switched ferromagnetic latching support in a levitating support position according to the disclosure.

FIG. 5 illustrates another exemplary embodiment of latch system 100 activated and the surface 180 in a levitational support position. In this embodiment, additional thermally switchable ferromagnetic material 184 is positioned on the second side 182 of the surface 180. The additional thermally switchable ferromagnetic material 184 provides a decreased magnetic reluctance, thereby increasing the magnetic force available in the magnetic flux circuit 126.

Figure 6:
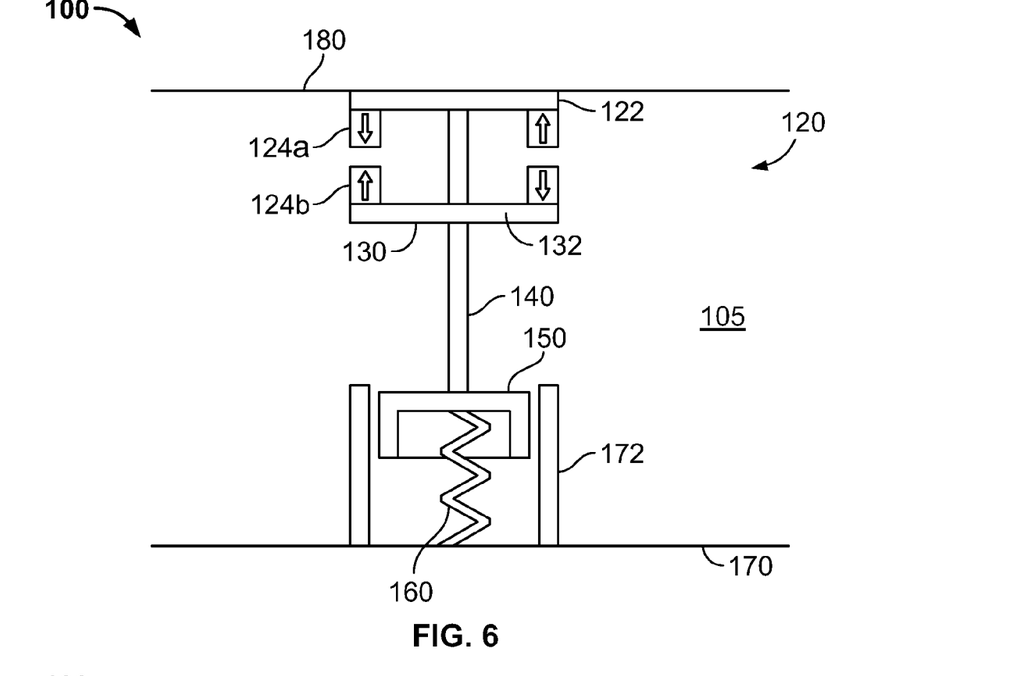
FIG. 6 illustrates another exemplary embodiment of a passive, thermally switched ferromagnetic latching support system in a mechanical support position according to the disclosure.

FIG. 6 illustrates another exemplary embodiment of a latch system 100 in a mechanical support position. In this embodiment, the thermally switchable ferromagnetic element 122 is attached to the surface 180. The surface 180 is also a thermal control surface. In this exemplary embodiment, two permanent magnets 124a are mounted on the switchable ferromagnetic element 122. The latch element 130 includes two opposing permanent magnets 124b mounted on support element 132 connected to support post 140. The opposing permanent magnets 124a, 124b are magnetically oriented to be in repulsive force. The support element 130 may be a ferromagnetic or non-ferromagnetic element. The thermally switchable ferromagnetic element 122 acts as a magnetic flux shunt between each of the permanent magnets 124a. When the support element 132 is ferromagnetic, the support element 132 acts as a flux shunt between each of the permanent magnets 124b. As shown in FIG. 6, the switchable ferromagnetic element 122 is deactivated, or in other words, is not being cooled as described above, and the magnetic repulsion between the opposing permanent magnets 124a, 124b is weak and the spring force of the spring 160 is stronger so as to urge the support post 140 into mechanical support of the surface 180. In another embodiment, one or more opposing permanent magnets 124a, 124b may be used.

Figure 7:
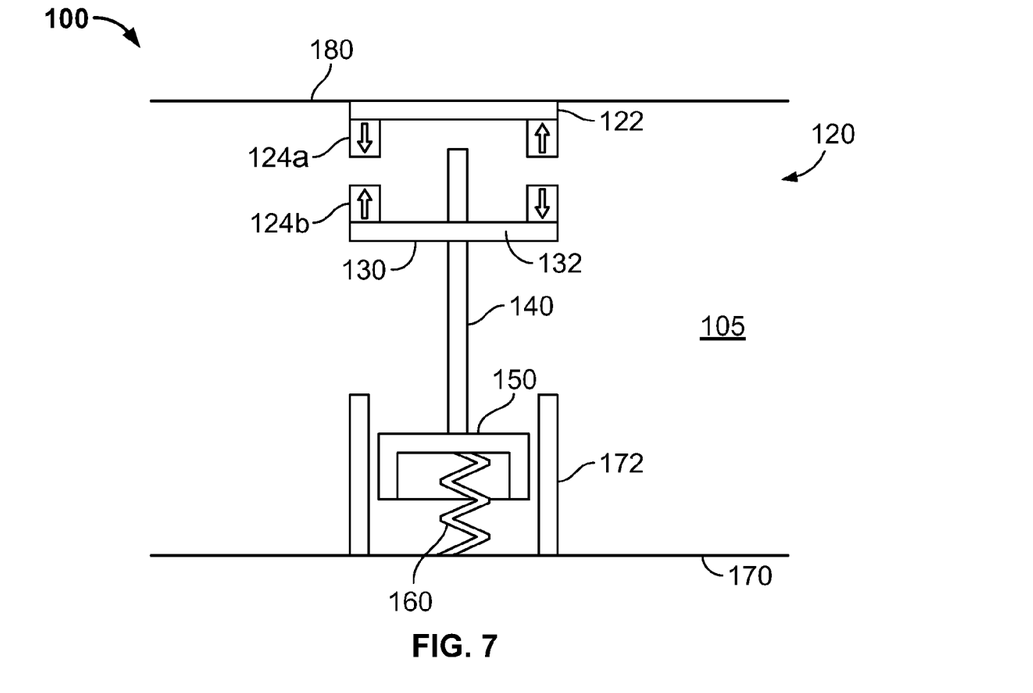
FIG. 7 illustrates another exemplary embodiment of a passive, thermally switched ferromagnetic latching support system in a levitating support position according to the disclosure.

FIG. 7 shows the latch system 100 activated and the surface 180 in a levitational support position with the switchable ferromagnetic element 122 activated. As shown in FIG. 7, the switchable ferromagnetic element 122 is activated and the magnetic repulsion of the opposing permanent magnets 124a, 124b is greater than the force of the spring 160 applied to the spring support cup 150, resulting in the support post 140 being withdrawn and retracted from contacting the support surface 180.

Figure 8:
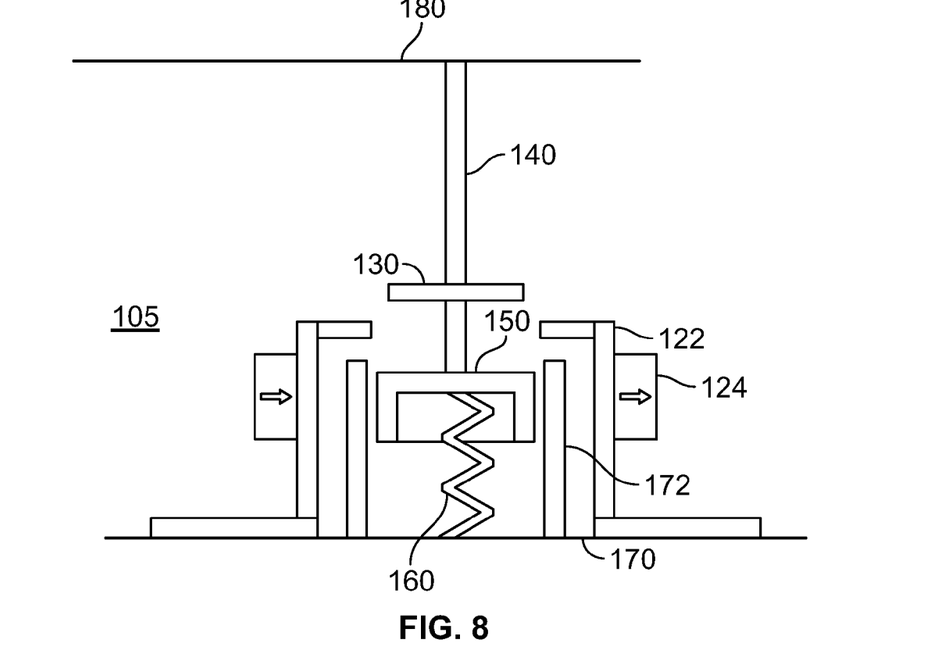
FIG. 8 illustrates another exemplary embodiment of a passive, thermally switched ferromagnetic latching support system in a mechanical support position according to the disclosure.

FIG. 8 illustrates another exemplary embodiment of the latch system 100 in a mechanical support position. In this embodiment, the switchable ferromagnetic element 122 is in physical and thermal contact with the ambient support 170, and the ambient mechanical support 170 is also a thermal control surface. In this embodiment, the surface 180 may or may not be a thermal control surface.

Figure 9:
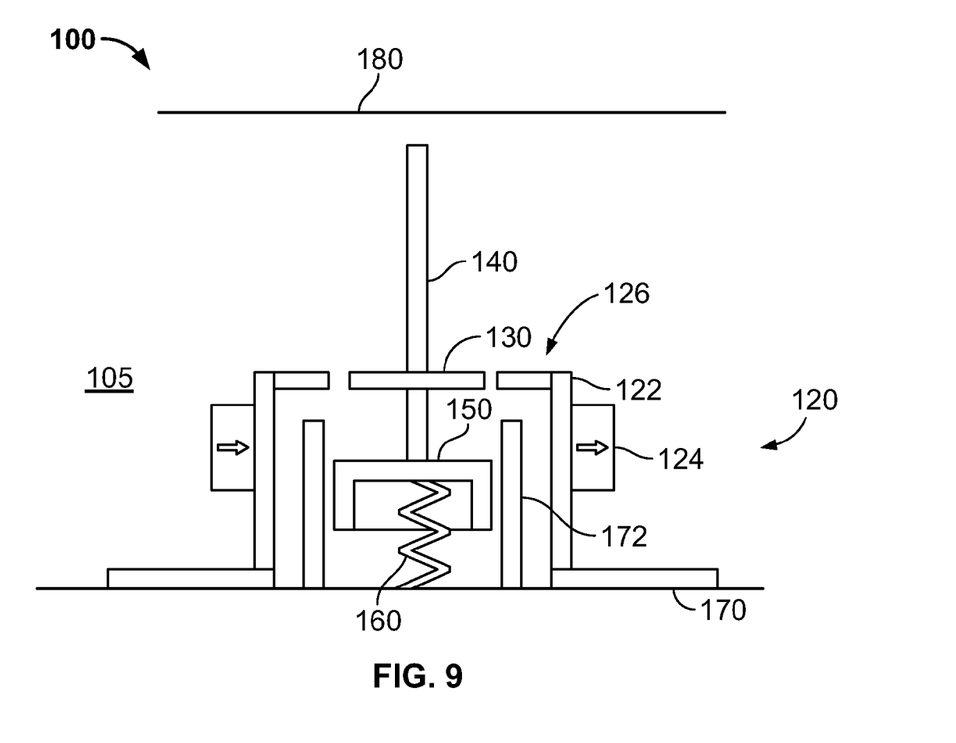
FIG. 9 illustrates another exemplary embodiment of a passive, thermally switched ferromagnetic latching support system in a levitating support position according to the disclosure.

FIG. 9 shows the latch system 100 of FIG. 8 activated and the surface 180 in a levitational support position. As can be seen in FIG. 9, the switchable ferromagnetic element 122 has been activated by lowering the temperature of the ambient support 170, and a magnetic flux circuit 126 has been formed by the permanent magnet 124, the activated switchable ferromagnetic element 122, and the latch element 130. The magnetic flux circuit 126 has formed a magnetic force strong enough to overcome the force of the spring 160 and has withdrawn and retracted the support post 140 from contact with the surface 180.

Figure 10:
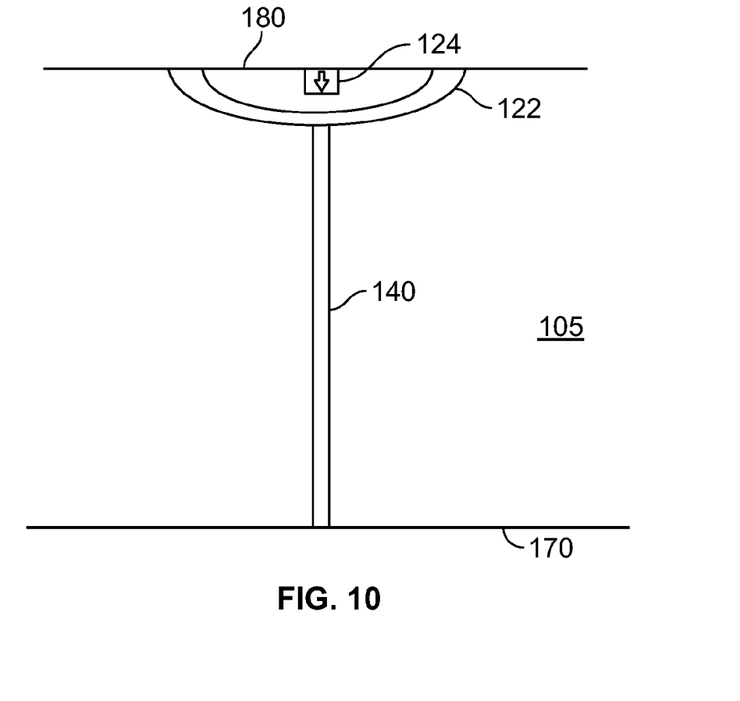
FIG. 10 illustrates another exemplary embodiment of a passive, thermally switched ferromagnetic latching support system in a mechanical support position according to the disclosure.

FIG. 10 illustrates another exemplary embodiment of the latch system 100 in a mechanical support position. In this embodiment, the thermally switchable ferromagnetic element 122 is a flexible strip and the support post 140 is attached to the ambient mechanical support 170. The thermally switchable ferromagnetic element 122 contacts the support post 140 and acts as a mechanical connection between the support post 140 and the surface 180.

Figure 11:
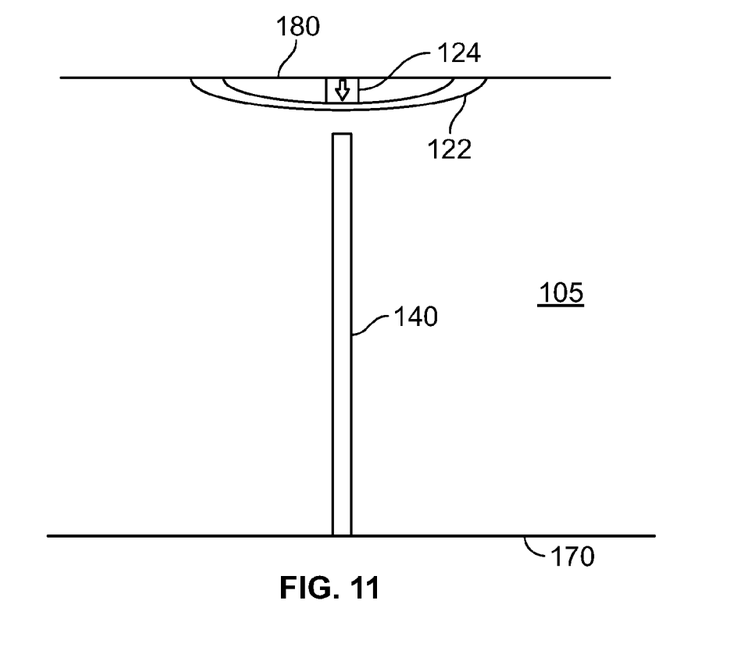
FIG. 11 illustrates another exemplary embodiment of a passive, thermally switched ferromagnetic latching support system in a levitating support position according to the disclosure.

FIG. 11 shows the latch system 100 of FIG. 10 activated and the surface 180 in a levitational support position. As can be seen in FIG. 11, the switchable ferromagnetic element 122 has been activated by lowering the temperature of the surface 180, and the activated switchable ferromagnetic element 122 has been attracted to the permanent magnet 124. The magnetic attractive force between the switchable ferromagnetic element 122 and the permanent magnet 124 is strong enough to overcome the bending force of the switchable ferromagnetic element 122, thereby deforming the switchable ferromagnetic element 122 and withdrawing it from contact with the support post 140, resulting in a break in the physical contact between the support post 140 and the surface 180.

Figure 12:
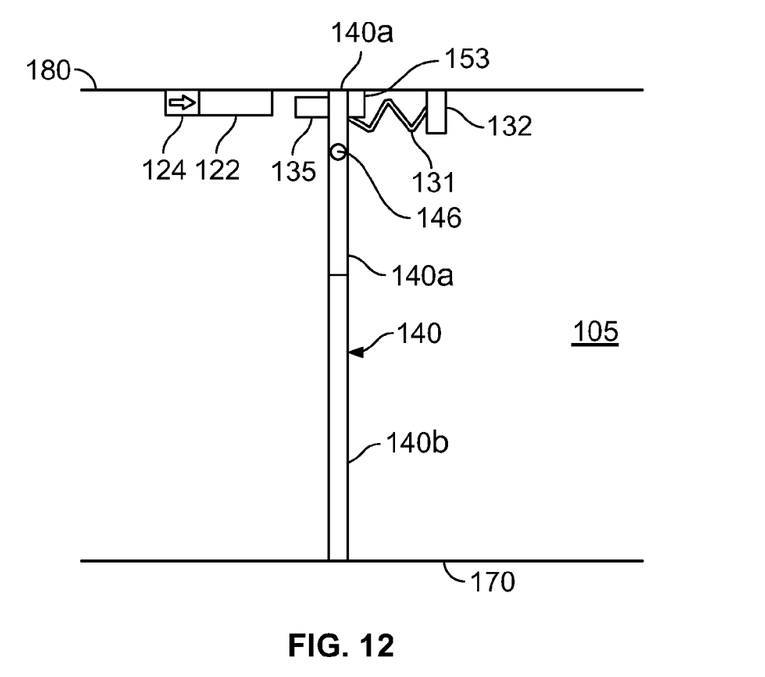
FIG. 12 illustrates another exemplary embodiment of a passive, thermally switched ferromagnetic latching support system in a mechanical support position according to the disclosure.

FIG. 12 illustrates another exemplary embodiment of the latch system 100 in a mechanical support position. In this embodiment, the support post 140 is divided into a first support post element 140a and a second support post element 140b. The first support post element 140a is pivotally fixed to pivot element 146. In another embodiment, the support post 140 may be divided into two or more elements. In this embodiment, the latch system 100 further includes a spring 131 attached to a spring support 132 and the first support post element 140. A spring 131 pulls the first support post element 140a against a mechanical stop 153 so as to align the first support post element 140a and the second support post element 140b to provide mechanical support to the surface 180.

Figure 13:
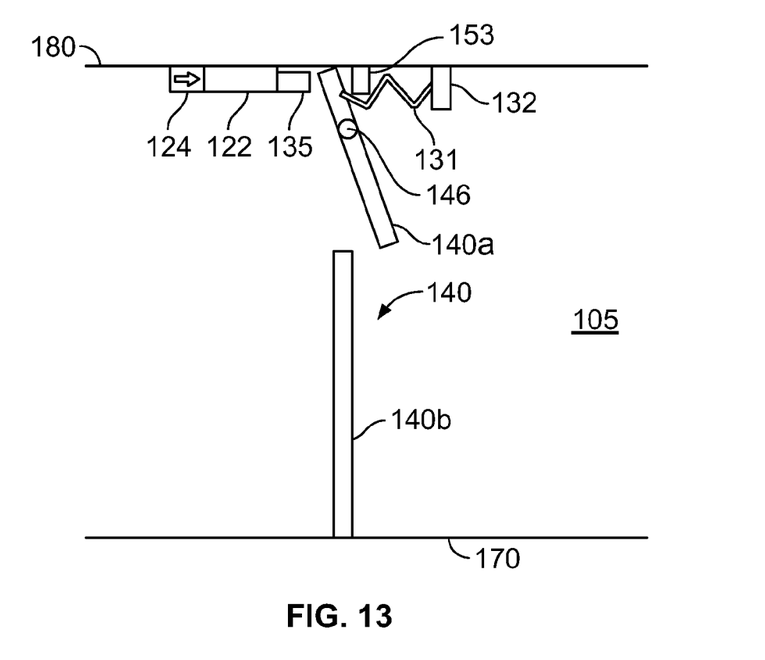
FIG. 13 illustrates another exemplary embodiment of a passive, thermally switched ferromagnetic latching support system in a levitating support position according to the disclosure.

FIG. 13 shows the shows the latch system 100 of FIG. 12 activated and the surface 180 in a levitational support position. The switchable ferromagnetic element 122 has been activated by lowering the temperature of the surface, which is then magnetically attracted to the a non-switchable latch element 135 and permanent magnet 124. The magnetic attractive force is strong enough to overcome the spring force of the spring 131, thereby pivoting the first support element 140a towards the switchable ferromagnetic element 122, resulting in a break in the physical contact between the first support post element 140a and the second support post element 140b, thereby physically separating the surface 180 from the second support post element 140b and the surface 180.

When the thermally switchable ferromagnetic element 122 is activated, as discussed above, the thermally switchable ferromagnetic element 122 and the permanent magnet 124 magnetically attract the non-switchable latch element 135 causing the upper support post element 140a to pivot at pivot element 146 and pull away from surface 180 as shown in FIG. 13.

Figure 14:
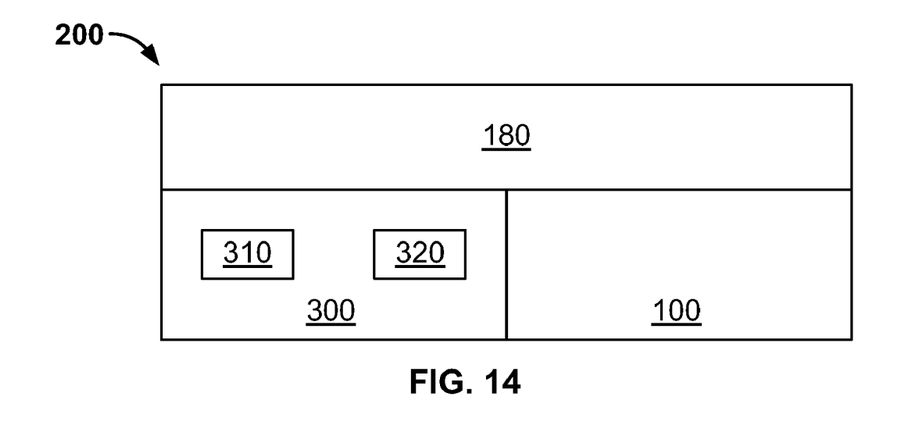
FIG. 14 illustrates an exemplary embodiment of a levitation system according to the disclosure.

FIG. 14 is a block diagram showing an embodiment of an exemplary levitation system 200 according to the disclosure. The levitation system 200 includes a latch system 100 and a high-temperature superconductor (HTS) levitation system 300. The HTS system 300 includes a HTS component 310 and a permanent magnet 320.

Figure 15:
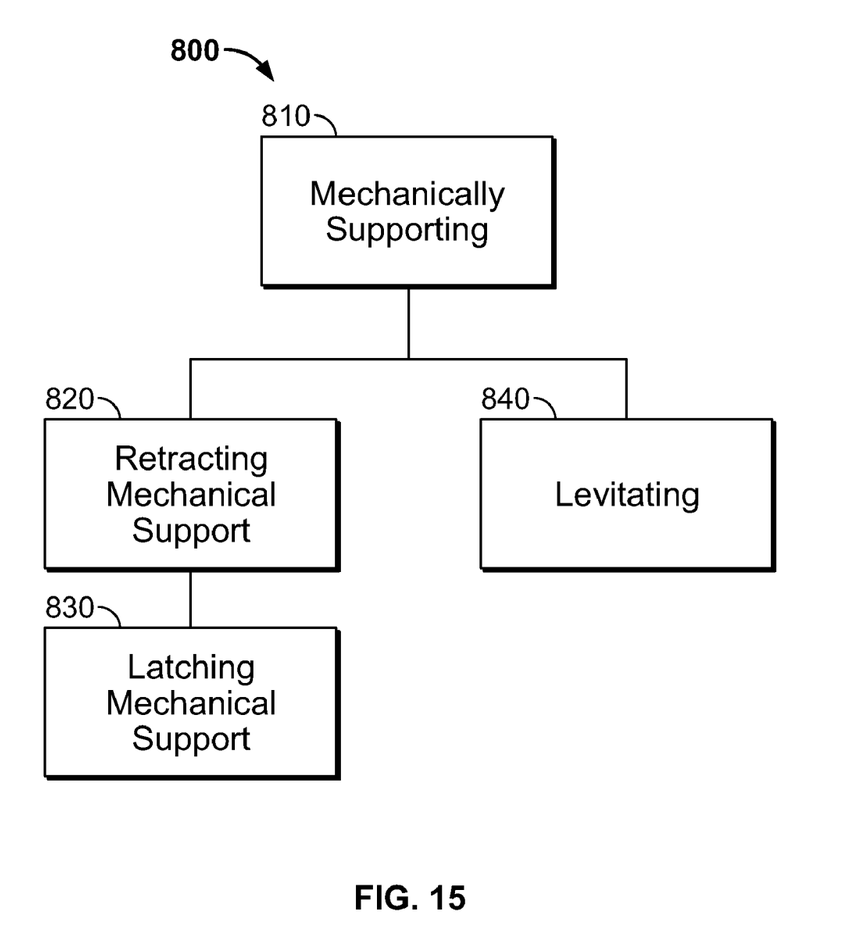
FIG. 15 is a flow chart depicting an exemplary method of supporting an object in a levitated position according to the disclosure.

FIG. 15 depicts an exemplary embodiment of a method of supporting an object 800 according to the disclosure. As can be seen in FIG. 15, the method includes the steps of mechanically supporting an object in a mechanical support position by a mechanical support 810, retracting the mechanical support from the object 820, and latching the mechanical support into a latched position by a magnetic flux generated by a ferromagnetic latching support system 830. The mechanical support is latched into the latched position by a magnetic flux between a thermally switchable ferromagnetic element and a ferromagnetic element. The mechanical support is latched into the latched position by a magnetic flux between a thermally switchable ferromagnetic element and a permanent magnet. The method may further include levitating the object by a HTS system 840. The HTS system levitates the object by forming a magnetic pressure between a high temperature superconductor element and a permanent magnet. Levitation by the HTS systems occurs when the HTS system is activated and the mechanical support is withdrawn, transferring the support of the body from the mechanical support to the levitation system.

Figure 16:
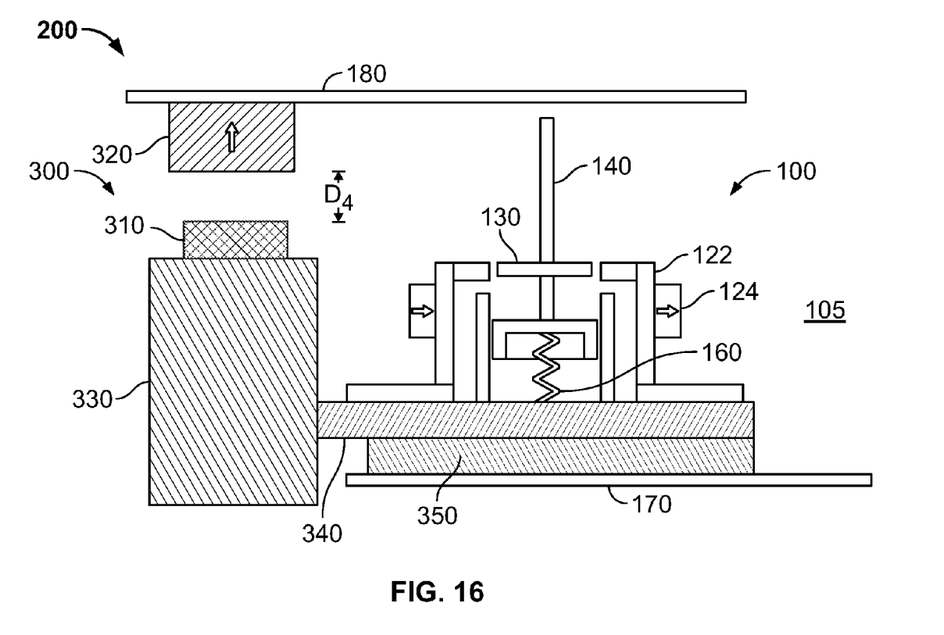
FIG. 16 illustrates an exemplary embodiment of a levitation system in a levitating support position according to the disclosure.

FIG. 16 illustrates an exemplary embodiment of a levitation system 200 according to the disclosure. The levitation system 200 is disposed in the space 105 between the surface 180 and the ambient mechanical support 170. The levitation system includes a latch system 100 and a HTS levitation system 300. The function of the latch system 100 is to enhance the thermal insulation of the surface 180 and/or an object supported by the surface 180. The HTS system 300 includes a HTS component 310 and a permanent magnet 320. In this exemplary embodiment, the HTS levitation system 300 further includes a cold source 330, a thermal bus 340, and thermal insulation 350 between the thermal bus 340 and the ambient mechanical support 170. The space 105 may be a vacuum and/or there may be insulation 540 as shown in FIG. 18 to further insulate the surface 180 and/or any supported object. In one embodiment, the insulation 540 may be a multi-layer insulation, for example, multiple layers of an aluminized polymer film. In one embodiment, the aluminized polymer film may be MYLAR®, produced by E.I. du Pont de Nemours and Company.

The HTS component 310 is formed of a superconducting material. In one embodiment, the HTS component is formed of bulk YBCO superconducting material. In other embodiments, other superconducting material may be used, for example superconducting materials, such as those disclosed in U.S. Pat. No. 6,046,139, which is incorporated by reference in its entirety, may be used.

In this embodiment, the cold source 330, for example a cold head of a cryocooler (not shown), is in thermal contact with the HTS component 310. The thermal bus 340 physically and thermally connects the cold source to the latch system 100. The permanent magnet 320, connected to the surface 180 interacts with the HTS component 310 to provide levitation. As further shown in FIG. 13, the latch system 100 has been activated and the support post 140 has been withdrawn from mechanically supporting the surface 180 and is in a latched position.

In some embodiments, when the HTS levitation system 300 is activated and the support post 140 of the latch system 100 is withdrawn from contact with the surface 180, the distance $D_4$ between the HTS component 310 and the permanent magnet 320 may decrease to build up magnetic pressure for the levitation of the surface 180. In this position, the levitation system 200 provides force and stability required to keep surface 180 in an equilibrium position. It should be understood that any of the embodiments of the latch system 100 described above and within the scope of this disclosure may be used within the levitation system 200. For various components and operations of HTS related systems, U.S. Pat. Nos. 5,214,981, 5,540,116, 5,640,887, 5,554,583, 5,557,177, and 6,153,958 are hereby incorporated by reference in their entirety.

Figure 17:
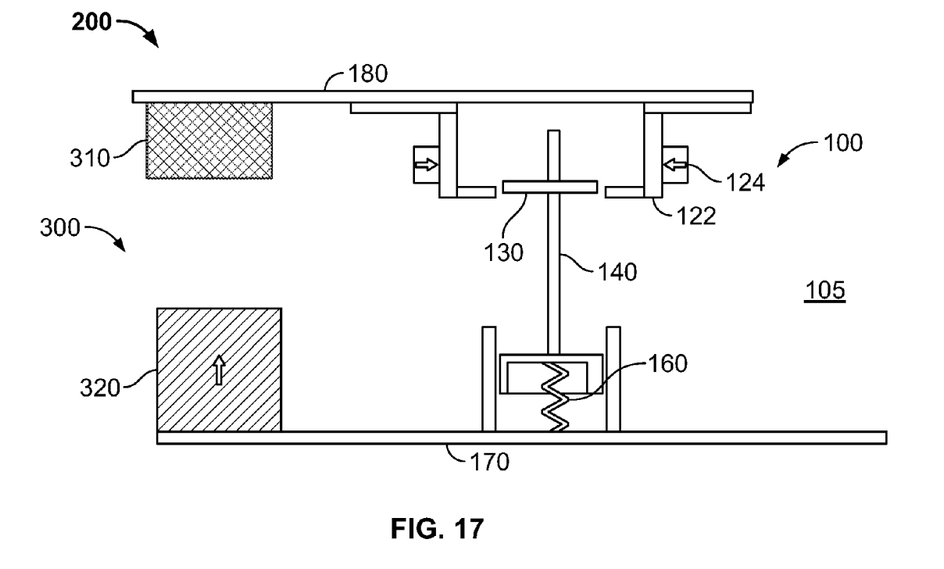
FIG. 17 illustrates another exemplary embodiment of a levitation system in a levitating support position according to the disclosure.

FIG. 17 illustrates another exemplary embodiment of a levitation system 200 in a levitating support position. In this embodiment, the surface 180 is also a thermal control surface. The HTS component 310 is in thermal communication with the surface 180, so that, as described above, cooling the surface 180 activates the HTS component 310. For example, the surface 180 may be cooled by a cooled cryogenic liquid. The latch system 100 is also in thermal communication with the surface 180, so the latch system 100 is also activated by cooling surface 180. The levitation system 200 is configured to cool and activate the HTS component 310 before cooling and activating the switchable ferromagnetic element 124 of the latch system 100, so the HTS levitation system 300 activates before the latch system 100. When the surface 180 is heating, the latch system 100 deactivates before the HTS levitation system 300 deactivates. In one embodiment, the thermal path to the switchable ferromagnetic element 124 is longer than the thermal path to the HTS component 310. As discussed above, the latch system 100 may provide part of the levitational force to the surface 180. If the latch system 100 provides additional levitational support, the surface 180 may move slightly to a new equilibrium position with the HTS levitational system continuing to provide levitational support and stability against movement away from the equilibrium position. In another embodiment, the latch system 100 does not provide levitational support.

FIG. 18 illustrates an exemplary embodiment of an object support system 400. In this embodiment, the surface 180 is the surface of an object 405 having a first component 410, a second component 420, and a third component 430. In one embodiment, the object 405 is a flywheel, and the first component 410 is a shaft, the second component 420 is a motor or generator, and the third component 430 is a flywheel. In another embodiment, the object 405 may have one or more components. In this embodiment, which is an application of the embodiment described in FIG. 13, the latch system 100 and the HTS levitation system 300, when activated, levitate the object 405.

Figure 19:
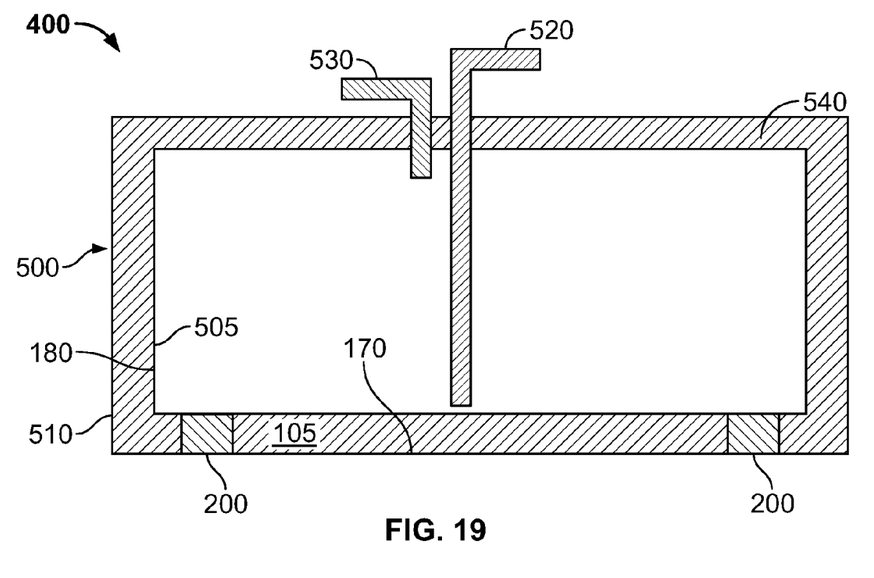
FIG. 19 illustrates another exemplary embodiment of an object support system according to the disclosure.

FIG. 19 illustrates another exemplary embodiment of an object support system 400. In this embodiment, the object support system 400 is a storage system. The storage system 400 includes a levitation system 200. The storage system 400 further includes an inner tank 505 having a surface 180 supported within an outer tank 510 having an ambient mechanical support 170. The inner tank 505 is separated from the outer tank 510 by a space 105. In one embodiment, the storage system 400 is a cryogenic storage tank. In one embodiment, the storage system 400 is a liquid hydrogen (LH2) storage tank.

The storage system 400 further includes a drain line 520, a fill line 530, and thermal insulation 540 disposed in the space 105. The thermal insulation 540 may be a multi-layer thermal insulation. In another embodiment, the space 105 may be a vacuum. In this exemplary embodiment, the storage system 400 further includes two levitation systems 200. In another embodiment, the object support system 400 may include one or more levitation systems 200. The levitation systems 200 are activated by introducing a cryogenic fluid into the inner tank 180 through the fill line 530. When activated, the levitation system 200 contributes to the thermal insulation of the inner tank 505 by supporting and physically and thermally separating the inner tank 505 from the outer tank 510 without mechanical support. In another embodiment, a mechanical support (not shown) may be included between the inner tank 505 and the outer tank 510.

While the disclosure has been described with reference to exemplary embodiment, it will be understood by those skilled in the art that various changes may be made and equivalents may be substituted for elements thereof without departing from the scope of the disclosure. In addition, many modifications may be made to adapt a particular situation or material to the teachings of the disclosure without departing from the essential scope thereof. Therefore, it is intended that the disclosure not be limited to the particular embodiments disclosed as the best mode contemplated for carrying out this disclosure, but that the disclosure will include all embodiments falling within the scope of the appended claims. It is therefore intended that the following appended claims and claims hereafter introduced are interpreted to include all such modifications, permutations, additions, and sub-combinations as are within their true spirit and scope.

The invention claimed is:

1. A ferromagnetic latching support system for supporting an object, comprising:
   a support surface for the object;
   a mechanical support system; and
   a high temperature superconductor support system, the high temperature superconductor system being a levitation device that includes a permanent magnet element and a high temperature superconductor element;
   wherein the mechanical support system supports the surface and the object when the temperature of the support surface is above the Curie temperature, $T_{c2}$, of the high temperature superconductor element; and
   wherein the high temperature superconductor system levitates the surface and the object when the temperature of the support surface is below the Curie temperature $T_{c2}$ of the high temperature superconductor element.

2. The system of claim 1, wherein the mechanical support system includes a retractable mechanical support element.

3. The system of claim 2 wherein the retractable mechanical support system includes a support post, an elastic support element and an elastic element.

4. The system of claim 1 wherein the high temperature superconductor element is in thermal contact with the support surface.

5. The system of claim 1 further including a source for cooling the support surface so that the support surface is a cooled thermal control surface.

6. The system of claim 5 further including a cooling fluid for cooling the thermal control surface.

7. The system of claim 6 wherein the cooling fluid is a cryogenic fluid.

8. The system of claim 5 further including a cooling system for cooling the thermal control surface.

9. The system of claim 8 wherein the cooling system is a solid state cooling system.

10. The system of claim 1 wherein the high temperature superconductor support system provides passive stability to the support surface for the object in three orthogonal directions.

11. The system of claim 1 wherein the high temperature superconductor element is in thermal contact with the support surface for the object.

12. The system of claim 1 further including a cold source, wherein the high temperature superconductor element is in thermal contact with the cold source.

* * * * *